(12) United States Patent
Klosterhalfen

(10) Patent No.: US 7,346,602 B2
(45) Date of Patent: Mar. 18, 2008

(54) AVOIDING CREATION OF DATABASE STATISTICS

(75) Inventor: Jorg Klosterhalfen, Cologne (DE)

(73) Assignee: Software Engineering GmbH, Dusseldorf (DE)

( * ) Notice: Subject to any disclaimer, the term of this patent is extended or adjusted under 35 U.S.C. 154(b) by 594 days.

(21) Appl. No.: 11/088,711

(22) Filed: Mar. 24, 2005

(65) Prior Publication Data

US 2005/0240567 A1    Oct. 27, 2005

(30) Foreign Application Priority Data

Mar. 25, 2004    (EP)    ................... 04007174

(51) Int. Cl.
*G06F 17/30* (2006.01)
(52) U.S. Cl. ............... 707/2; 707/7; 707/102
(58) Field of Classification Search ............ None
See application file for complete search history.

(56) References Cited

U.S. PATENT DOCUMENTS

2002/0087587 A1    7/2002 Vos et al.

2004/0034643 A1    2/2004 Bonner et al.

FOREIGN PATENT DOCUMENTS

EP    04007174.8    9/2004

*Primary Examiner*—Charles Rones
*Assistant Examiner*—Belix M Ortiz
(74) *Attorney, Agent, or Firm*—Robert L. Epstein; Epstein Drangel Bazerman & James, LLP

(57) ABSTRACT

The invention relates to a method for providing access paths to data within a database, in particular using REBIND for DB2, wherein real time database statistics are determined using a database integrated monitor, wherein the database statistics are output substantially in real time using the database integrated status monitor, and wherein the database statistics from the integrated monitor are used to initiate generation of data set statistics, and to determine the access paths. To allow efficient generation of access paths, the following steps are proposed: determining from the database statistics a total number of rows of at least one data set of the database, comparing the determined total number of rows with a first threshold value, deciding solely based on the total number of rows to provide a database catalogue with the data set statistics in case the total number of rows reaches the threshold value, and determining the access paths to the data based on the data set statistics within the database catalogue.

15 Claims, 2 Drawing Sheets

US 7,346,602 B2

AVOIDING CREATION OF DATABASE STATISTICS

FIELD OF THE INVENTION

The invention relates to a method for providing access paths to data within a database, in particular using REBIND for DB2, wherein real time database statistics are determined using a database integrated monitor, wherein the database statistics are output substantially in real time using said database integrated status monitor, wherein said database statistics from said integrated monitor are used to initiate generation of data set statistics, and to determine said access paths.

The invention also relates to a device with a database unit for the operation of a relational database, wherein said database unit comprises statistics generation means for determining database statistics in real time, and access path generation means for generating access paths to data of said database based on data set statistics stored in a database catalogue within said database.

The invention is in particular within the area of relational databases, in particular DB2 from International Business Machines (IBM) on an OS/390 or z/OS operating system. In a relational database like IBM's DB2, data is managed in a multitude of indexes and tables. The data itself is represented physically by data sets and stored on a storage medium. The position, structure and size of the data sets are modified by read/write access during operation of the database. The database system accesses the data sets, which are changed in response to user input as well as due to internal work specifications. Due to these changes, the number of data sets increases and the level of organization decreases over time. The database provides integrated utilities, and commands that may be used to conduct organization within said data sets and to provide statistics about the data sets.

BACKGROUND OF THE INVENTION

The collection of statistics regarding the status of the data within the data sets is an important task within databases. The statistics provide insight into the internal workings of the database. The statistics about the data sets may be retrieved using the RUNSTATS utility within DB2.

The generation of access paths to access data within the database using Structured Query Language (SQL) statements is also an important task within databases. Therefore, the database DB2 provides the commands BIND and REBIND, which allow generating access paths to data. BIND and REBIND use information about the structure and statistics of the data sets.

Reorganization of the database, in particular of data sets, is crucial to obtain good access time. During operation of the database, the database system relocates data within the data sets in response to internal processing controls in order to guarantee faster access to the data. Relocation of data occurs preferably in accordance with logical criteria so that data that belongs together is also physically stored together. However, after longer periods of operation, a good organization of the data is no longer guaranteed because of a multitude of relocation operations. Because of the multitude of relocation operations due to standard operation, a state of disorganization is created on the database that prevents fast access times to the data. In order to be able to guarantee fast access times to the data, the data must be reorganized once a certain degree of disorganization has been reached. The database may provide a utility for this purpose, too. For DB2 this utility is called REORG.

In DB2, the aforementioned utilities are REORG, and RUNSTATS. Other utilities are also available for maintaining data sets. To calculate access paths, DB2 provides the commands BIND and REBIND.

In addition, the statistics determined by RUNSTATS are used by the DB2 utility OPTIMIZER, which may be used to provide improved indexes to access the data.

It is the goal of database users to have databases available 24 hours a day, 7 days a week. A 24/7 level of database availability in mainframes means constant good response times (for example, by real time reorganization and by real time statistics collection for constant optimization of data access), constant avoidance of errors (by real time reactions to critical situations), rapid recovery times in the event of faults (for example, by real time back up operations), as well as only minor interference of applications due to maintenance work. The prerequisite hereto, however, is that monitoring and maintaining of the database must take place virtually in real time. In addition, contention and look-ups due to REORG and RUNSTATS operations should be kept at a minimum.

To maintain the database, it is known to provide access paths using the commands and utilities REORG plus RUNSTATS plus REBIND in combination. The drawback however is that with data sets which have only changed little since the last REBIND, the resulting access paths do not change in most cases, i.e., they do not provide faster access to the data in most cases. It has been found that over 90% of all RUNSTATS results are worthless, as no gain in access time may be achieved.

It is also known to obtain information about the level of disorganization within data sets running RUNSTATS on a regular basis. As running RUNSTATS needs lots of processing capabilities, it should be avoided to run unnecessary RUNSTATS. In addition, running RUNSTATS invalidates existing SQL in Dynamic Statement Caches, which have been established by DB2 during executing dynamic SQL. The Dynamic Statement Cache stores access path information to data for dynamic SQL when it is executed the first time. In case the same SQL is executed again, the already existing access path may be used. When running RUNSTATS, the information within the Dynamic Statement Cache may become invalid, as the stored access paths may become invalid. Therefore, unnecessary RUNSTATS should also be avoided.

According to developments in the DB2 world, a Real-Time Statistics (RTS) utility has been introduced to DB2. RTS gathers information about all objects in a DB2 system, but RTS are not a replacement for RUNSTATS. RUNSTATS gathers information and populates the DB2 Catalog, providing information for the DB2 Optimizer and REORG. This affects all applications as the Optimizer determines access paths for all SQL processing. RTS populates tables created for RTS that are not used by the DB2 Optimizer. RTS are not used as anything more than utility trigger values.

RTS were introduced by IBM to try to solve utility problems. Using RTS to determine when to run a utility such as a REORG, COPY or RUNSTATS, can eliminate unnecessary utility runs and application downtime. Once activated, RTS gathers statistics constantly for all objects in the DB2 system. This adds almost no processing overhead to DB2.

The statistics of RTS are in current systems evaluated by complicated algorithms to determine when to run RUN- STATS or REORG. These algorithms facilitate information about percentage of changed rows, pages, percentage of growth of tables, number of mass deletes, any occurrence of REORGs or LOADS without RUNSTATS since the last RUNSTATS. However, obtaining this information requires processing time. In addition, this information may not lead to good access paths after RUNSTATS and REBIND. The problem with this information is that the decision whether to run RUNSTATS might not lead to improved access paths after REBIND.

For small tables, the above-mentioned information leads to running RUNSTATS often, as the required threshold values are reached quickly. However, in particular for small tables, only small improvements may be observed, if any.

It has been observed that the majority of RUNSTATS operations do not improve access to data. In contrast, as RUNSTATS and REORG and following REBIND operations cause lock-ups and contention of the data sets and the DB2 Catalog, the effect is that data may be retrieved on average slower than without providing RUNSTATS, REORG and REBIND.

SUMMARY OF THE INVENTION

The technical problem derived from the aforementioned is solved in accordance with the invention by determining from said database statistics a total number of rows of at least one data set of said database, comparing said determined total number of rows with a first threshold value, deciding solely based on said total number of rows to provide a database catalogue with said data set statistics in case said total number of rows reaches said threshold value, and determining said access paths to said data based on said data set statistics within said database catalogue.

Using database-integrated monitoring, which in the case of DB2 is realized as real time statistics (RTS), an active monitoring of the status of the data sets is possible with minimum system workload. DB2 RTS externalized these collected status data in adjustable intervals in tables created for this purpose. Real time may comprise a period of a few minutes to a few hours. For example, an output is advantageous after 30 minutes or after 1 hour.

The output status data are analyzed in accordance with the invention in real time such that the total amount of rows is determined. This may be done fast and with a minimum of processing requirements. The determined total number of rows is then compared with a first threshold value. In case the total number of rows reaches or exceeds this threshold value, the generation of data set statistics is initiated. This may be done by starting RUNSTATS in DB2. RUNSTATS provides the database catalogue with statistics about the data sets, which statistics in turn may be used to generate new access paths. The access path generation may be done by REBIND.

As RUNSTATS and REBIND are only initiated when certain threshold values are reached by the total number of rows of a table, unnecessary RUNSTATS and REBINDS may be avoided. The threshold values may be chosen such that it is most likely that a RUNSTATS and REBIND will result in access paths, which provide faster access to the data. The change within the tables may be accounted for with appropriate threshold values. Only if significant changes occurred to the tables, REBIND will provide better access paths. Therefore, only if a significant change in the total number of rows is detected, RUNSTATS and REBIND will provide improved access paths.

According to further embodiments, it is proposed that a level of disorganization of said data set is determined from said database statistics, wherein said determined level of disorganization is compared with a second threshold value, and wherein in case said level of disorganization of said data set reaches said second threshold value said data set is re-organized. The level of disorganization may be determined from RTS data. For instance the tablespace values: number of changed rows, percentage of indirect references, number of un-clustered inserts, and the number of mass deletes. Also the index values: percentage of changed rows, number of mass deletes, percentage of mapped rows, distance of leaves, percentage of large object disorganization, and number of index level changes may be used to determine the level of disorganization. All these information are available from RTS. In case the disorganization has reached a certain level, it only makes sense to run RUNSTATS after the data sets have been re-organized by REORG.

To determine, when the next collection of data set statistics will become due, it is proposed that an absolute or relative distance between said total number of rows and said first threshold value is determined.

In such a case, it is also proposed that in case said distance is smaller than a certain value, said re-organization of data sets and said provision of data set statistics is carried out in combination. One distance, which was found to be appropriate, was +/−25% of the first threshold values.

By that, it is accounted for that in case re-organization becomes necessary, it is checked first whether the generation of data set statistics will be necessary in the near future. In such a case, the re-organization is carried out inline with generation of data set statistics. For DB2 this may be the operation REORG with inline RUNSTATS and REBIND.

In addition, in case the total number of rows decreases, the second threshold value may be reached even though the last RUNSTATS was carried out only a short time before, e.g. the total number of rows has not changed significantly, e.g. less than 25%. In such case only a REORG is necessary. A new RUNSTATS may be omitted and only REORG initiated.

To avoid unnecessary generation of data set statistics, it is proposed that in case said distance is greater than a certain value, only said re-organization of said data set is carried out when said level of disorganization reaches said second threshold value. Thus, in case the total number of rows is in between two first threshold values and a RUNSTATS operation would not provide improved results, the RUNSTATS operation may be avoided, even though re-organization of data sets by REORG may still be carried out.

For increasing number of data sets within databases, the number of total rows may increase permanently over time. Therefore, not only one threshold value may indicate the initiation of RUNSTATS. The RUNSTATS utility may be necessary for various threshold values; therefore, it is proposed that a plurality of first threshold values is established.

It has been found that certain threshold values provide good results. For this reason, it is proposed that said first threshold values are established between 0-35.000, 35.001-100.000, 100.001-275.000, 275.001-1.000.000, 1.000.001-1.500.000, and/or 1.500.001-higher number of rows. In particular it has been found that good results are obtain when said first threshold values are established at 20.000, 50.000, 150.000, 500.000, and/or 1.500.000, with a variation of +/−50%.

Tools are available which allow determining the effect of RUNSTATS and REBIND on access paths. These tools allow estimating the effect of new access path generation on the access time by checking various values available from RTS. Therefore, it is proposed that said first threshold values are determined by checking the effect of access path generation for said threshold values by providing a weighted sum of different database statistic values and providing an estimate of improvements of access paths for said threshold values based on said weighted sum.

In particular, for fluctuating databases, where tables regularly change in size, it might cause unnecessary overhead when RUNSTATS are generated especially when the change in the total number of rows lasts only a short period. For this reason, it is proposed that a change over time of said determined total number of rows is determined and wherein said database catalogue is provided with new data set statistics only in case said change of said total number of rows persists for a pre-determined time.

For tables with fast changing content, especially those that go rapidly to nearly empty, it might be useful not to run RUNSTATS if the total number of rows has not reached the previous maximum. Otherwise, the access path could be changed for the worse. Therefore, it is proposed that said database catalogue is not provided with new data set statistics where said total row cardinality changes rapidly over time.

In case a RUNSTATS has been run on data sets which have previously changed rapidly over time, and the data sets are expected to change again soon; so called volatile tables; the database catalogue should not be filled with data set statistics of the recent RUNSTATS. Therefore, it is proposed that said database catalogue is provided with previous data set statistics in case said total row cardinality has changed rapidly over time and new data set statistics have already been determined.

Another aspect of the invention is a device, with a database unit for the operation of a relational database, wherein said database unit comprises statistics generation means for determining database statistics in real time, and access path generation means for generating access paths to data of said database based on data set statistics stored in a database catalogue within said database, characterized by providing counting means for determining from said database statistics a total number of rows of at least one data set of said database, comparison means for comparing said determined total number of rows with a first threshold value, decision means for deciding solely based on said total number of rows to provide a database catalogue with said data set statistics in case said number of rows reaches said threshold value, wherein said access path generation means determine said access paths to said data based on said data set statistics within said database catalogue.

A further aspect of the invention is a computer program for providing access paths to data within a database, in particular using REBIND for DB2, operable to cause a processor to determine real time database statistics using a database integrated monitor, put out the database statistics substantially in real time using said database integrated status monitor, use said database statistics from said integrated monitor to initiate generation of data set statistics, and to determine said access paths, which is characterized by determining from said database statistics a total number of rows of at least one data set of said database, comparing said determined total number of rows with a first threshold value, deciding solely based on said total number of rows to provide a database catalogue with said data set statistics in case said total number of rows reaches said threshold value, and determining said access paths to said data based on said data set statistics within said database catalogue.

Yet, another aspect is a computer program product comprising such a computer program.

The invention is described hereinafter in detail based on a drawing showing an exemplary example.

BRIEF DESCRIPTION OF THE DRAWING

In the drawing, the figures show.

DETAILED DESCRIPTION OF THE INVENTION

Figure 1:
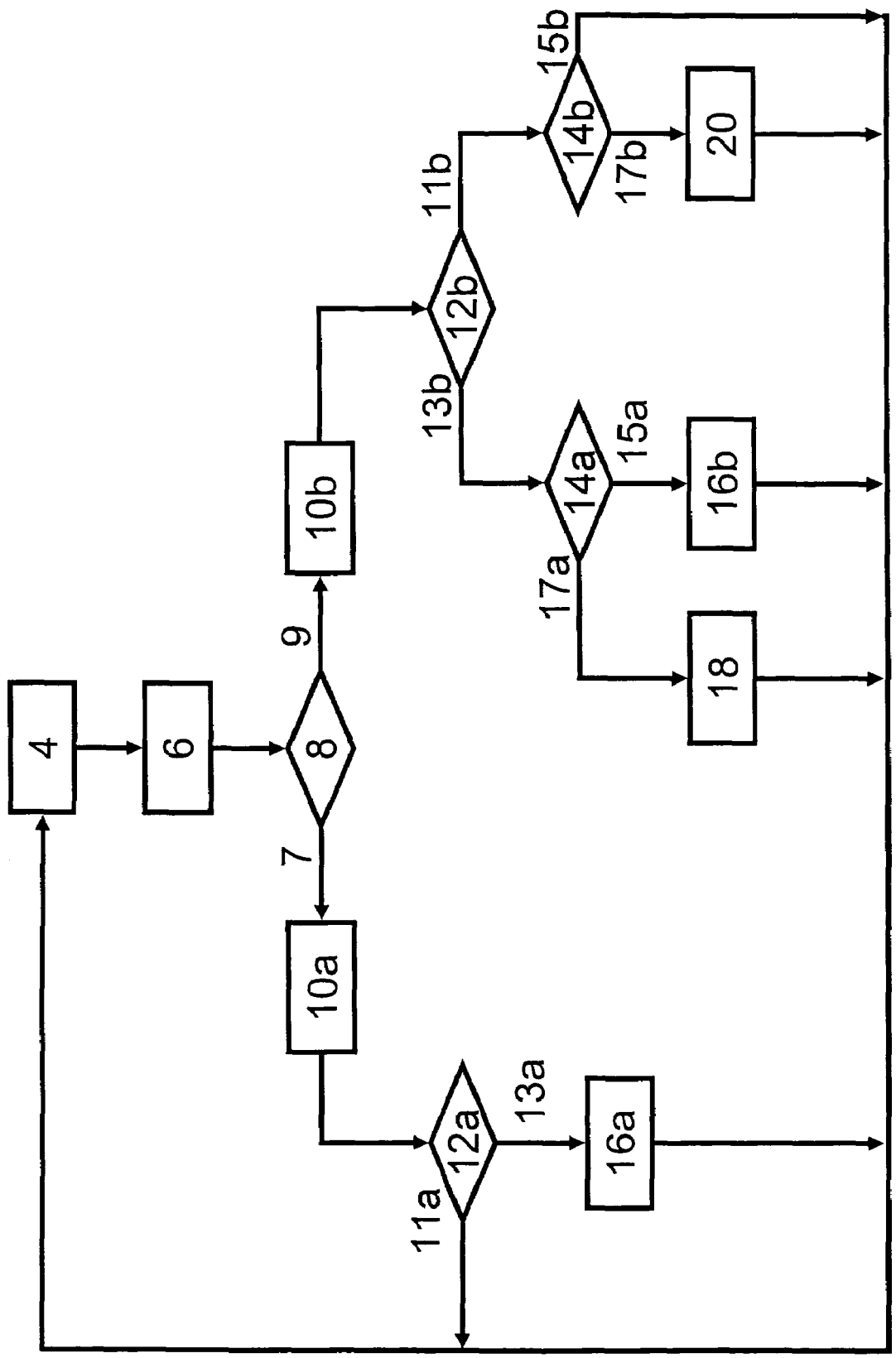
FIG. 1 a flowchart of an inventive method.

The flow chart of FIG. 1 depicts a method in accordance with the invention. In the following the designations and terms within IBM's DB2 are used. The invention, however, can be used for any relational database.

Database 2 comprises a plurality of data sets. These data sets are accessed in order to perform the method.

One of said data sets (DSNRTSDB) contains the statistics yielded by the real time statistics (RTS) feature integrated in the database system. These statistics are output in determinable time intervals, preferably every half hour. DSNRTSDB contains two tables SYSIBM.TABLESPACESTATS and SYSIBM.INDEXSPACESTATS. These tables contain the status of the data sets. The data sets may comprise tables. The status of the data sets and their organization may be stored in indexes. The data contained in DSNRTSDB are accessible using SQL queries. The data therein are in particular information about the total number of rows in the individual data sets.

The RTS feature integrated in the database uses only a few resources and thus database performance does not suffer due to the constant provision of statistics in the RTS tables.

The function of the process can be described as follows:

Statistical information about information about COPY, REORG, and RUNSTATS will only be recorded and externalized by the RTS function when these utilities have been executed for the respective data set with the RTS function enabled. In this case, a table entry is initialized for this data set by the RTS function and taken into consideration at the next externalization.

The recorded RTS are read from the DSNRTSDB data sets (4). After the RTS have been read (4), a distance between the total number of rows, which has been determined from the RTS and a first threshold value, which threshold value may represent a total number of rows, is determined (6). This distance may be an absolute value of total number of rows between the actual total number of rows and the total number of rows determined by the first threshold value. It may also be a relative distance between the actual total number of rows and the total number of rows determined by the first threshold value.

After that, it is checked (8), whether the determined distance is within a certain range or outside this range. E.g. the relative distance between the actual number of total number of rows and the threshold value of total number of rows differs less than 25%, the actual value is within the determined range.

In case the actual total number of rows is outside the range (7), a level of organization may be determined (10a) from the table space values: number of changed rows, percentage of indirect references, number of un-clustered inserts, and the number of mass deletes. In addition, the index values: percentage of changed rows, number mass deletes, percentage of mapped rows, distance of leaves, percentage of large object disorganization and number of index level changes may also be used to determine the level of organization (10*a*).

After the level of organization has been determined (10*a*), this level is compared (12*a*) with a second threshold value, which may define an organizational level of said data sets. This second threshold value may account for freely defined values where a reorganization of data sets has been found to be useful. In case the second threshold value is not reached (11*a*) again the RTS are read (4). In case the second threshold value is reached (13*a*), a REORG is initiated (16*a*). The REORG provides organization of data sets within data base 2. After the REORG is terminated, the RTS are again read (4).

Additionally, even in case the actual total number of rows is outside the range (9), a level of organization may be determined (10*b*) from the table space values: number of changed rows, percentage of indirect references, number of un-clustered inserts, and the number of mass deletes. In addition, the index values: percentage of changed rows, number mass deletes, percentage of mapped rows, distance of leaves, percentage of large object disorganization and number of index level changes may also be used to determine the level of organization (10*b*).

After the level of organization has been determined (10*b*), this level is compared (12*b*) with said second threshold value.

In case the second threshold value is reached (13*b*), it is checked whether the total number of rows increases or decreases (14*a*).

In case of decrease (15*a*) of total number of rows, only REORG (16*b*) is initiated and finally the RTS are again evaluated (4). As the number of rows decreases, and is still within the range, it may be concluded that the last RUNSTATS has been run shortly before and is nor necessary. However, as the level of organization requires, a REORG may still be initiated.

In case the total number of rows increases (17*a*), a REORG with inline RUNSTATS and REBIND is initiated (18). By that, the level of organization is improved, the data set statistics generated, and access parts using REBIND calculated. Thereafter, the RTS are again evaluated (4).

In addition, in case the second threshold value is not reached (11*b*), it is also checked whether the total number of rows increases or decreases (14*b*).

In case of decrease (15*b*) of total number of rows, the RTS are again evaluated (4). By that, it may be accounted for that recently a RUNSTATS has possibly been run, as the number of total number of rows is still within the range and decreasing. Besides having already RUNSTATS statistics, the level of organization does not require REORG. Therefore, no further actions are required.

In case the total number of rows increases (17*b*) a RUNSTATS and REBIND is initiated (20). By that, the data set statistics are generated, and access paths using REBIND calculated. Thereafter, the RTS are again evaluated (4).

The inventive method allows providing RUNSTATS statistics together with REBIND and REORG only if necessary. Unnecessary RUNSTATS or REORGS may be avoided.

Figure 2:
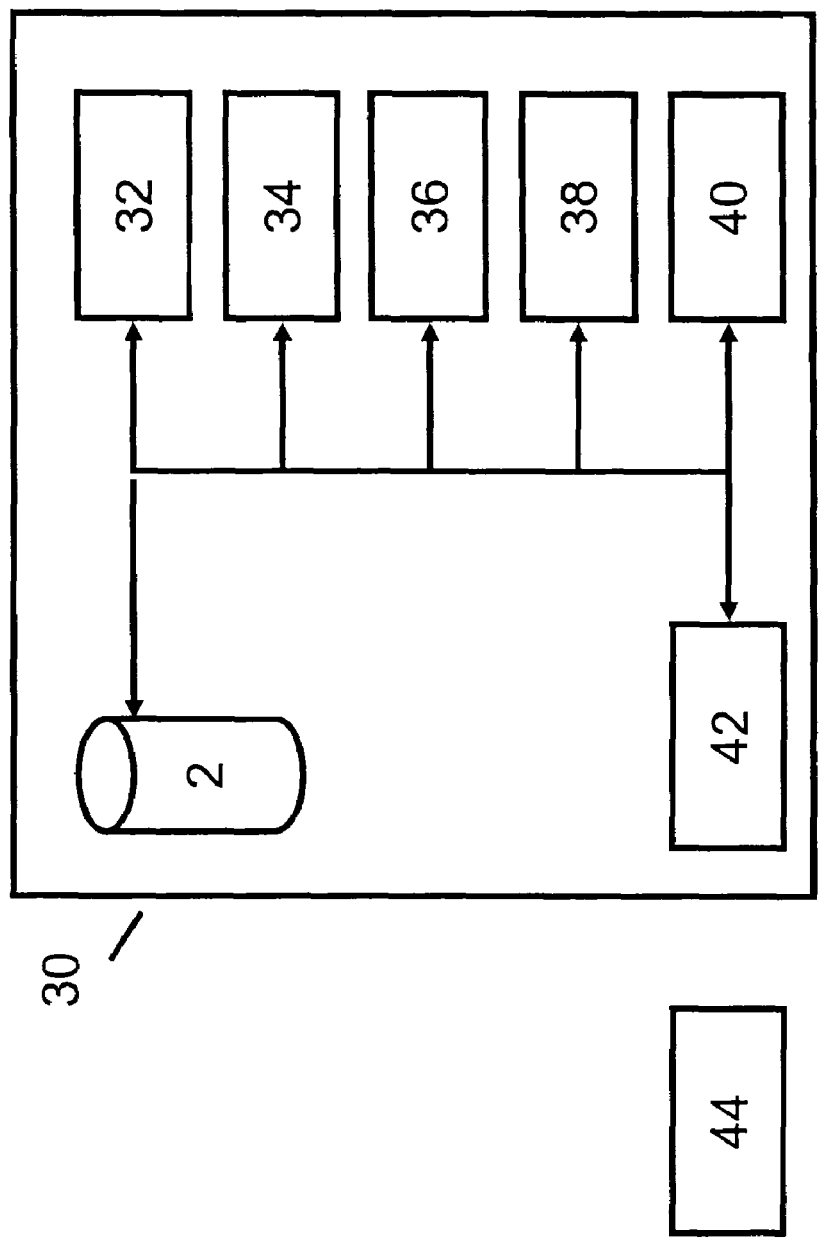
FIG. 2 a system according to the invention.

FIG. 2 depicts a data base unit 30. The database unit 30 comprises a database 2. The data from database 2 are read by statistic generation means 32 to determine data base statistics in real time. An access path is generated by access path generating means 34, executing REBIND operations on the database 2.

Counting means 36 count the total number of rows determined from RTS, and provide the counted total number of rows to comparison means 38. Comparison means 38 compare the total number of rows, and a level of organization of the database with threshold values. Depending on the result of comparison means 38, decision means 40 initiate RUNSTATS, REORG and/or REBIND according current needs.

In addition, the database unit 30 may comprise a processor 42 operating said statistic generation means 32, said access path generation means 34, said counting means 36, said comparison means 38, and said decision means 40.

In addition, said processor 42 may be driven by a computer program stored on a computer program product 44.

What is claimed is:

1. A computer implemented method for avoiding unnecessary generation of data set statistics,
   wherein real time database statistics are determined using a database integrated monitor,
   wherein the database statistics are output substantially in real time using said database integrated status monitor,
   wherein said database statistics from said integrated monitor are used to initiate generation of data set statistics, and to determine said access paths, with
   determining from said database statistics a total number of rows of at least one data set of said database,
   comparing said determined total number of rows with a first threshold value,
   deciding solely based on said total number of rows to provide a database catalogue with said data set statistics in case said total number of rows reaches said threshold value, and
   determining said access paths to said data based on said data set statistics within said database catalogue.

2. The method of claim 1, wherein a level of disorganization of said data set is determined from said database statistics, wherein said determined level of disorganization is compared with a second threshold value, and wherein in case said level of disorganization of said data set reaches said second threshold value said data set is re-organized.

3. The method of claim 1, wherein an absolute or relative distance between said total number of rows and said first threshold value is determined.

4. The method of claim 3, wherein in case said distance is smaller than a certain value, said re-organization of data sets and said provision of data set statistics is carried out in combination.

5. The method of claim 3, wherein in case said distance is greater than a certain value, only said re-organization of said data set is carried out when said level of disorganization reaches said second threshold value.

6. The method of claim 1, wherein a plurality of first threshold values is established.

7. The method of claim 6, wherein said first threshold values are established between 0-35.000, 35.001-100.000, 100.001-275.000, 275.001-1.000.000, 1.000.001-1.500.000, and/or 1.500.001-higher number of rows.

8. The method of claim 6, wherein said first threshold values are established at 20.000, 50.000, 150.000, 500.000, and/or 1.500.000, with a variation of +/−50%.

9. The method of claim 1, wherein said first threshold values are determined by checking the effect of access path generation for said threshold values by providing a weighted sum of different database statistic values and providing an estimate of improvements of access paths for said threshold values based on said weighted sum.

10. The method of claim 1, wherein a change over time of said determined total number of rows is determined and wherein said database catalogue is provided with data set statistics only in case said change of said total number of rows persists for an pre-determined time.

11. The method of claim 1, wherein said database catalogue is not provided with new data set statistics where a total row cardinality changes rapidly over time.

12. The method of claim 1, wherein a database catalogue is provided with previous data set statistics in case said total row cardinality has changed rapidly over time and new data set statistics have already been determined.

13. A computer implemented device
   with a database unit for the operation of a relational database,
   wherein said database unit comprises statistics generation means for determining database statistics in real time, and
   access path generation means for generating access paths to data of said database based on data set statistics stored in a database catalogue within said database, with
   counting means for determining from said database statistics a total number of rows of at least one data set of said database,
   comparison means for comparing said determined total number of rows with a first threshold value,
   decision means for deciding solely based on said total number of rows to provide a database catalogue with said data set statistics in case said total number of rows reaches said threshold value,
   wherein said access path generation means determine said access paths to said data based on said statistics within said database catalogue.

14. A computer program stored on a storage medium for providing access paths to data within a database, in particular using REBIND for DB2, operable to cause a processor to
   determine real time database statistics using a database integrated monitor,
   put out the database statistics substantially in real time using said database integrated status monitor,
   use said database statistics from said integrated monitor to initiate generation of data set statistics, and to determine said access paths, with
   determining from said database statistics a total number of rows of at least one data set of said database,
   comparing said determined total number of rows with a first threshold value,
   deciding solely based on said total number of rows to provide a database catalogue with said data set statistics in case said total number of rows reaches said threshold value, and
   determining said access paths to said data based on said data set statistics within said database catalogue.

15. A computer program stored on a storage medium product comprising a computer program for providing access paths to data within a database, in particular using REBIND for DB2, operable to cause a processor to
   determine real time database statistics using a database integrated monitor,
   put out the database statistics substantially in real time using said database integrated status monitor,
   use said database statistics from said integrated monitor to initiate generation of data set statistics, and to determine said access paths, with
   determining from said database statistics a total number of rows of at least one data set of said database,
   comparing said determined number of rows with a first threshold value,
   deciding solely based on said number of rows to provide a database catalogue with said data set statistics in case said number of rows reaches said threshold value, and
   determining said access paths to said data based on said statistics within said database catalogue.

* * * * *